(12) United States Patent
Weber et al.

(10) Patent No.: US 7,899,644 B2
(45) Date of Patent: Mar. 1, 2011

(54) THREAT LAUNCH DETECTION SYSTEM AND METHOD

(75) Inventors: Jonathan L. Weber, Nashua, NH (US); John Mandzy, Hollis, NH (US); Paul I. Egbert, Merrimack, NH (US); Kirby A. Smith, Derry, NH (US); Jill A. Shea, Hollis, NH (US); John L. Downing, III, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 440 days.

(21) Appl. No.: 10/588,247

(22) PCT Filed: Feb. 7, 2005

(86) PCT No.: PCT/US2005/003811
§ 371 (c)(1),
(2), (4) Date: Aug. 2, 2006

(87) PCT Pub. No.: WO2008/027023
PCT Pub. Date: Mar. 6, 2008

(65) Prior Publication Data
US 2008/0208514 A1 Aug. 28, 2008

Related U.S. Application Data

(60) Provisional application No. 60/542,042, filed on Feb. 5, 2004.

(51) Int. Cl.
*G06F 17/40* (2006.01)
*G06F 17/00* (2006.01)

(52) U.S. Cl. ............. 702/134; 702/127; 702/183; 342/2; 340/945

(58) Field of Classification Search .................. 702/134, 702/127, 183
See application file for complete search history.

(56) References Cited

U.S. PATENT DOCUMENTS
4,107,530 A 8/1978 Brumfield et al.
(Continued)

FOREIGN PATENT DOCUMENTS
WO 2008027023 A2 3/2008

OTHER PUBLICATIONS

I.R. Edmonds (1986) "Prism-coupled compound parabola: a new ideal and optimal solar concentrator"; Optics Letters; 11(8):490-492.

(Continued)

*Primary Examiner* — Hal D Wachsman
(74) *Attorney, Agent, or Firm* — Paul F. Rusyn; Graybeal Jackson LLP; Daniel J. Long (57) ABSTRACT

A threat launch detection system includes at least one temporal threat detector, each temporal threat detector including a single sensing element operable to sense radiation from various types of short-burn threats that occur within a field of view of the detector. The single sensing element generates a detection signal in response to the sensed radiation. A processing circuit is coupled to each temporal threat detector and is operable to analyze the detection signal from each detector as a function of time to detect the occurrence of a short-burn threat within the field of view of any of the temporal threat detectors. Each temporal threat detector may be a prism-coupled compound parabolic concentrator (PCCP).

25 Claims, 5 Drawing Sheets

U.S. PATENT DOCUMENTS

| | | | |
|---|---|---|---|
| 5,287,110 A * | 2/1994 | Tran | 342/13 |
| 5,600,434 A * | 2/1997 | Warm et al. | 356/139.08 |
| 5,796,474 A | 8/1998 | Squire et al. | |
| 5,999,652 A * | 12/1999 | Bushman | 382/221 |
| 6,209,820 B1 | 4/2001 | Golan et al. | |
| 6,410,897 B1 | 6/2002 | O'Neill | |
| 6,527,222 B1 | 3/2003 | Redano | |
| 6,666,401 B1 | 12/2003 | Mardirossian | |
| 7,202,809 B1 | 4/2007 | Schade et al. | |
| 2003/0043058 A1 | 3/2003 | Jamieson et al. | |
| 2003/0205126 A1 * | 11/2003 | O'Neill | 89/1.11 |
| 2004/0119631 A1 * | 6/2004 | Sanders et al. | 342/14 |

OTHER PUBLICATIONS

International Search Report Dated Aug. 29, 2008, for International Patent Application No. PCT/US2005/003811 filed Feb. 7, 2005.

* cited by examiner

THREAT LAUNCH DETECTION SYSTEM AND METHOD

CROSS-REFERENCE TO RELATED APPLICATIONS

The present application is a national phase application filed pursuant to 35 USC §371 of International Patent Application Serial No. PCT/US2005/003811, filed 7 Feb. 2005; which claims the benefit of U.S. Provisional Application Ser. No. 60/542,042, filed 5 Feb. 2004, now expired; all of the foregoing applications are incorporated herein by reference herein in their entireties.

STATEMENT OF GOVERNMENT INTEREST

The invention was made with United States Government support under Contract (Grant) No. DMEA90-99-D-007 awarded by DMEA. The United States Government has certain rights in this invention.

TECHNICAL FIELD

The present invention relates generally to sensors and more particularly to threat warning detectors for short-burn and motorless threats such as tube launched missiles and direct fire projectiles.

BACKGROUND OF THE INVENTION

A threat launch detection system is a system that detects a weapon that is being directed at a target, with the target typically containing the threat launch detection system. In response to detecting a weapon directed at the target, which will be referred to as a threat or event throughout the present description, the threat launch detection system typically takes countermeasures to prevent the weapon from impacting the target. For example, an airplane may include a threat launch detection system designed to detect missiles fired at the airplane. When the system detects a missile, the system typically takes appropriate countermeasures in an attempt to prevent the missile from impacting the airplane, such as transmitting a signal to "jam" the seeker of the missile.

Different types of targets, which may be referred to as military vehicles in the following description, face different types of threats. Airplanes as previously mentioned face the threat of guided missiles, which may be "heat seeking" or infrared (IR) guided or radar guided missiles. Such missiles include engines or rockets that propel the missile through the air towards the airplane. Such a rocket continually burns to propel the missile and threat launch detection systems in aircraft exploit this fact to detect such threats. Other types of military vehicles, such as helicopters and tanks, face different types of threats. For example, a tank faces the threats of being shot at by a rocket propelled grenade (RPG), a shell from another tank, or any of a variety of other antitank weapons.

Threats such as a shell from another tank or an RPG are examples of what are known as "short-burn", "motorless," or "post-burnout" threats. These threats are so named because the charge or engine utilized to propel the threat is active for only a very short time when compared to other types of threats such as guided missiles. In the following description, such threats will be referred to simply as "short-burn" threats. As a result of the different characteristics of different types of threats, threat launch detection systems must be capable of detecting the types of threats most likely to be encountered by the type of military vehicle containing the system or the type of vehicle the system is designed to protect.

To detect these various types of threats, conventional threat launch detection systems utilize sensors formed by a sensor array in combination with suitable optics that provide a desired field of view (FOV) for the sensor. The field of view is the area that is sensed by the sensor. Such sensor arrays may be formed from infrared (IR), electro-optic (EO), or ultraviolet (UV) types of individual sensors. Such sensor arrays typically capture images at a rate of about 100 Hz and processing circuitry in the threat launch detection system analyzes the captured images to detect a threat. These sensor arrays are relatively small and to provide a good field of view for each sensor the focal length of the associated optics must be relatively small (i.e., as the focal length decreases the field of view increases). The focal length must be kept to a reasonable value and therefore the field of view of a typical sensor array is relatively narrow, meaning that a lot of sensor arrays are needed to provide the overall field of view required by the threat launch detection system.

In operation, each sensor captures images in its corresponding field of view and the processing circuitry analyzes successive images or frames. The processing circuitry detects threats based on the differences from one frame to another. By comparing frames and analyzing in which pixel or pixels of the sensor array the threat occurred, the processing circuitry determines when the threat was fired. The term "pixel" as used herein refers generally to one of the individual sensor elements contained in a sensor array, with the sensor elements being arranged in rows and columns to collectively form the sensor array. The processing circuitry also determines the direction of detected threat from which one or ones of the sensor arrays detected the threat and the distance of the threat from the detected intensity.

These sensor arrays and the associated processing utilize what may be termed "spatial tracking" to detect threats. In spatial tracking, the pixels in a given frame are analyzed relative to the pixels in adjacent frames as just described. The position of pixels in each frame that detect some image change from frame to frame as the threat moves through space, hence the term spatial tracking. The processing in spatial tracking typically involves track processing, a form of pattern recognition as part of the detection of a threat, as will be appreciated by those skilled in the art.

These conventional threat launch detection systems utilizing IR, EO, and/or UV sensor arrays are best suited to detecting threats having relatively long durations, such as the powered fly out of a guided missile. This is true partially because the time for acquisition and processing required to analyze the frames captured by each sensor array is relatively intensive, and, as previously mentioned, numerous sensor arrays are required to provide the required overall field of view for the system. Each of these sensor arrays has numerous pixels, and the processing circuitry must separately read and analyze the data of each pixel for each array.

This intensive processing caused by the multiple sensor arrays and the large number of pixels per sensor array limits the rate at which the system can operate and thereby limits the types of threats that can be reliably detected. Short-burn threats such as tank shells or RPGs are accordingly not reliably detected by conventional threat launch detection systems. It should also be noted that a key operational characteristic of threat launch detection systems is the elimination of false detections. To do so the system typically compares three to five or more successive frames from each sensor array and analyzes the pixels to ensure the threat is present in the same pixels or pixels in each of these frames. If the threat is of sufficient duration that it is present in these pixels for successive frames then a threat is detected. If the threat is not present in each of these frames, however, such as may be the case for short-burn type threats where the threat may only be present in one or two frames, the system determines the threat is false. With these conventional threat launch detection systems, even though a real threat such as an RPG has been directed at the target containing the system, the systems have problems reliably detecting the short-burn threat.

To detect the launch of short-burn threats, conventional threat launch detection systems typically utilize IR and EO sensors operating in one or two midwave infrared bands (3-5 micron wavelength). UV sensors have also been utilized in such systems as previously mentioned. Weapons have been designed for deployment via short-burn to reduce the duration of the observability of the threat and thus prevent the system from detecting the threat. Thus, although the sensors typically "see" the threat, meaning at least some pixels in at least one sensor detect the presence of the threat, the processing of these pixels does not detect the short-burn threat.

In an attempt to more reliably detect short-burn threats, some systems have attempted to perform "temporal profiling" of the frames captured by the IR, EO and UV sensor arrays. In temporal profiling, the individual pixels are analyzed over time rather than relative to other pixels as is the case in spatial tracking. Attempts at temporal profiling have been unsuccessful for a variety of different reasons. First, as previously discussed these sensors have insufficiency of sampling rate issues, namely the rate at which the sensor arrays capture images is too slow relative to the duration of short-burn threats. Additionally, the dynamic range (i.e., the range of detectable signals from the weakest to the strongest) of these sensor arrays is insufficient to reliably detect all the various types of short-burn threats.

These sensor arrays also have loss sharing issues, meaning that the threat is detected or "shared" by multiple pixels over time. This makes reliable analysis of these pixels over time or temporal profiling extremely difficult. Even sub pixel sized threats will form images that can fall on several pixels in a sensor array due to finite optics spot size. Any line of sight motion, whether due to movement of the threat or movement of the sensor base, changes the distribution of pixels on which threat falls. This may be termed sharing noise, and this sharing noise scales with the instantaneous amplitude of the signal detected by a given pixel, making it problematic regardless of how strong the signal. To obtain accurate intensity of signal information, the processing circuitry must determine where the signal is located and then estimate the nearby background to correct for this effect. This background is difficult to accurately estimate without performing hundreds or more calculations per pixel. This calculation is useful only when the pixels can be corrected for offset and gain variation, adding a requirement that a focal plane of the sensor and associated drive electronics be very stable electronically. Those skilled in the art will appreciate that offset error decreases in significance with increased signal but gain error scales with signal input.

There is a need for a threat launch detection system and method that can reliably detect various types of short-burn threats.

SUMMARY OF THE INVENTION

According to one aspect of the present invention, a threat launch detection system includes at least one temporal threat detector, each temporal threat detector including a single sensing element operable to sense radiation from various types of short-burn threats that occur within a field of view of the detector. The single sensing element generates a detection signal in response to the sensed radiation. A processing circuit is coupled to each temporal threat detector and is operable to analyze the detection signal from each detector as a function of time to detect the occurrence of a short-burn threat within the field of view of any of the temporal threat detectors.

Each temporal threat detector may be a prism-coupled compound parabolic concentrator (PCCP). Alternatively, each temporal threat detector may include a single sensor element and suitable optics for directing radiation within the field of view onto the sensor element. The threat launch detection system may further include a number of sensor arrays, with the processing circuitry operable in response to detecting the occurrence of a short-burn threat to process signals from the sensor arrays to more precisely identify a location of the short-burn threat relative to the system.

DETAILED DESCRIPTION OF PREFERRED EMBODIMENTS

Figure 1:
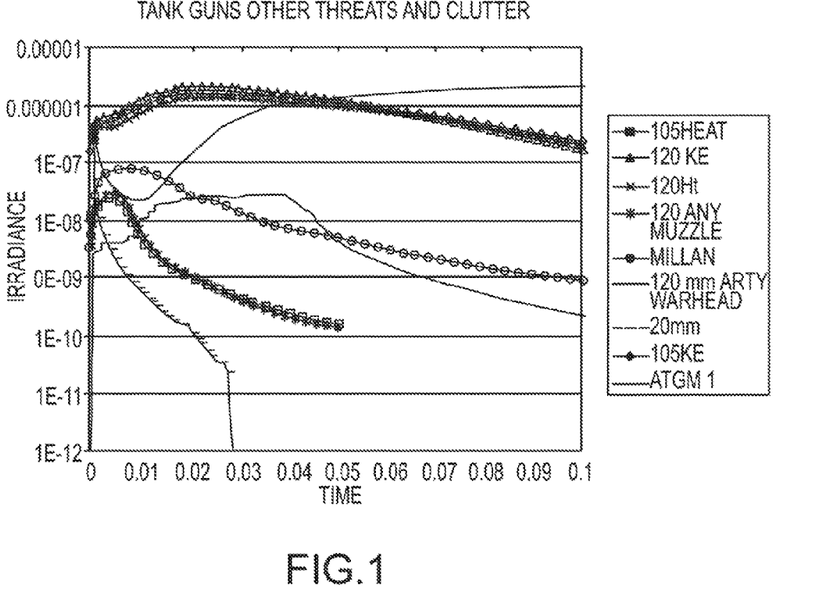
FIG. 1 is a graph showing irradiance as a function of time for various types of short-burn threats and clutter.

Before describing several embodiments of the present invention, the characteristics of several types of short-burn threats will be discussed with reference to FIG. 1. FIG. 1 is a graph showing irradiance as a function of time for various types of short-burn threats and clutter. Various short-burn threats and threat like events on the battlefield are distinct when observed or sensed at a frequency of 1000 Hz or above. FIG. 1 shows a sampling of such threats as measured by a fast radiometer, including several antitank guided missile time sequences with direct fire gun blasts, indirect fire artillery, warhead events, and machine gun fire. These sequences are all measured data from events at various distances from the radiometer.

FIG. 1 shows that a sensor capable of distinguishing threats would need a minimum of 20 pw/cm$^2$ sensitivity and a top end of about $2 \times 10^{-6}$ or about $1 \times 10^5 : 1$ dynamic range. The figure illustrates that temporal profiling to distinguish typical short-burn threats such as tank main gun fire and missile launches from detonations, artillery muzzle flashes, and machine gun fire is possible due to the differing temporal signals generated by such threats. For example, the machine gun and artillery muzzle flashes are much shorter than the tank main gun and missile launch signals. Similarly, the detonation of a 120 mm artillery shell lasts much longer than the tank main gun and missile launch threats of interest. In FIG. 1, the detonation of a 120 mm artillery shell is an example of a clutter event not to be detected as a threat.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Also, the operation of well known components and/or processes has not been shown or described in detail below to avoid unnecessarily obscuring the present invention. It should also be noted that in the figures and following description, references assigned to multiple components of the same kind include both numbers and letters, and that both the number and letter are utilized when referring to a specific one of these components and only the number is used when referring generally to any or all of such components.

Figure 2:
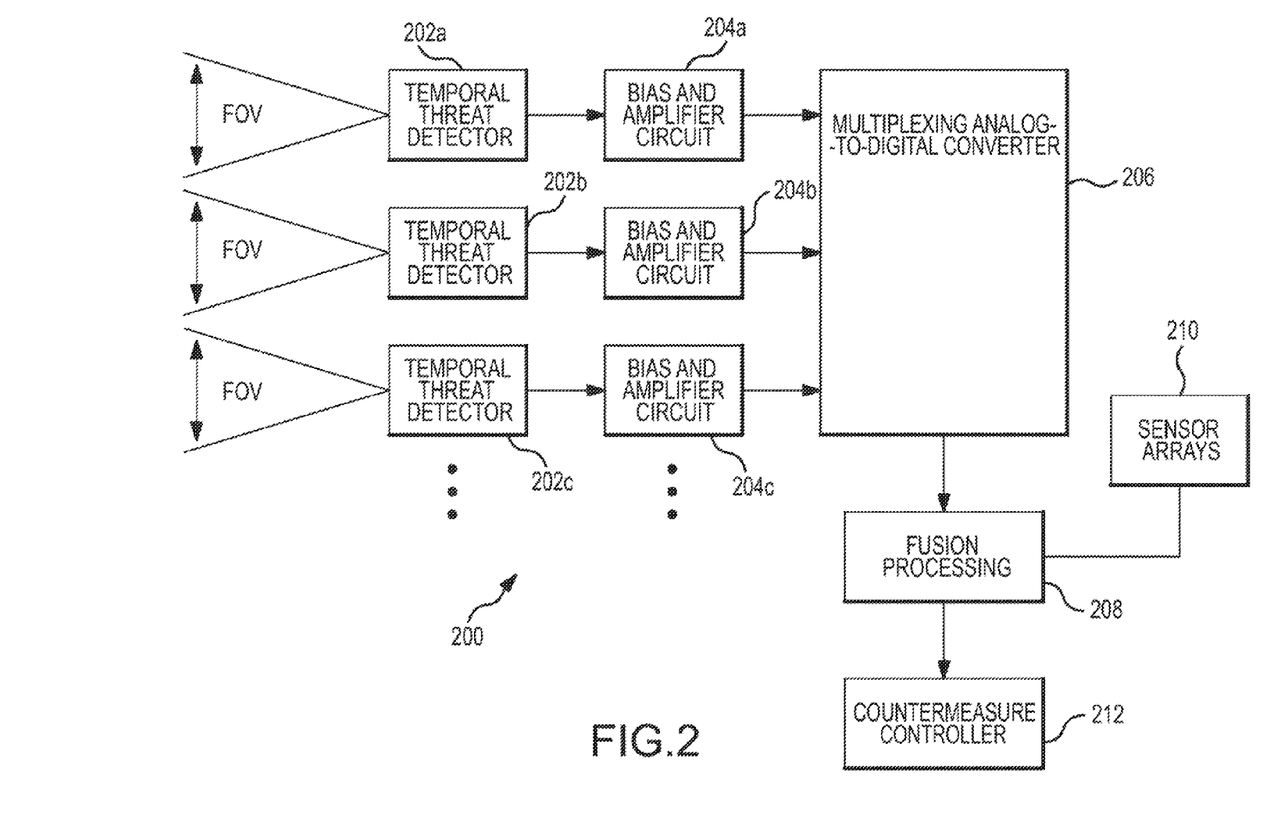
FIG. 2 is a schematic block diagram of a threat launch detection system according to one embodiment of the present invention.

FIG. 2 is a schematic block diagram of a threat launch detection system 200 according to one embodiment of the present invention. The threat launch detection system 200 includes a number of temporal threat detectors 202a, three of which 202a-c are shown in FIG. 2. Each temporal threat detector 202a-c has an associated field of view (FOV) as shown and includes a structure that captures a significant portion of the radiation generated by a short-burn threat SBT such as tank main gun fire within the field of view, as shown for the temporal threat detector 202a in FIG. 2. A single sensor element (not shown) within each temporal threat detector 202a-c senses the captured radiation and generates a corresponding detection signal in response to the sensed radiation.

The field of view of each temporal threat detector 202a-c is ideally relatively wide so that a small number of detectors are needed to sense the required overall region surrounding the system 200. For example, if each temporal threat detector 202a-c has a field of view of approximately 90 degrees, then four detectors are required to provide sensing of the entire 360 degrees surrounding the system 200 in horizontal plane. Note that in contrast to the sensor arrays previously described, each of the temporal threat detectors 202a-c is a very low resolution sensor, containing only a single sensing element for a relatively wide field of view. Thus, each of the temporal threat detectors 202a-c functions to provide a detection signal indicative of the occurrence of a short-burn threat but the precise location of the threat within the relatively wide field of view is not known, as will be discussed in more detail below.

The detection signal from each temporal threat detector 202a-c is applied to a corresponding bias and amplifier circuit 204a-c which biases and amplifies the received detection signal to thereby generate a corresponding conditioned detection signal. A multiplexing analog-to-digital (ND) converter 206 sequentially digitizes the conditioned detection signal from each of the bias and amplifier circuits 204a-c. In digitizing each conditioned detection signal, the ND converter 206 samples each signal and stores the samples in a corresponding buffer (not shown) within the converter. The ND converter 206 first digitizes the conditioned detection signal from the bias and amplifier circuit 204a, then digitizes the conditioned detection signal from the circuit 204b, and then the signal from the circuit 204c, and so on for each conditioned detection signal applied to the converter. The ND converter 206 continuously cycles through each of the applied conditioned detection signals and digitizes each such signal once during a cycle time of the converter.

A fusion processing circuit 208 retrieves the samples stored in each buffer (not shown) in the ND converter 206 and processes these samples to determine whether the corresponding detection signal indicates a short-burn threat has occurred within the field of view of the corresponding temporal threat detector 202a-c. Referring back to FIG. 1, the fusion processing circuit 208 need merely detect a rise and a fall of a pulse having a relatively short duration to detect the desired short-burn threats. In doing so, the fusion processing circuit 208 is analyzing characteristics of the corresponding detection signal over time and in this way is determining a temporal profile of the signal. In one embodiment, the fusion processing circuit 208 includes a temporal template for each short-burn threat to be detected. Other methods include basis set development and eigenvector computation. The fusion processing circuit 208 compares each detection signal to each of the templates or eigenvectors and determines a short-burn threat exists when the detection signal approximately matches one of the temporal templates. One skilled in the art will appreciate other techniques that the fusion processing circuit 208 may utilize in processing each of the detection signals to determine whether a short-burn threat has occurred.

When the fusion processing circuit 208 detects a short-burn threat has occurred, the circuit assigns a number of parameters to the detected threat. First, the circuit 208 assigns a timestamp to the threat indicating when the threat started. The circuit 200 and also assigns a type indicator to the threat indicating the type of short-burn threat detected and assigns an identifier indicating which of the temporal threat detectors 202a-c detected the threat. In this way, the identifier indicates within which field of view the detected short-burn threat occurred.

Once the fusion processing circuit 208 detects a threat and assigns the associated parameters, the circuit processes signals from sensor arrays 210 to more precisely identify the location of the threat relative to the system 200. The sensor arrays 210 are conventional IR, EO, and/or UV type sensor arrays as previously described. To more precisely identify the location of the threat, the fusion processing circuit 208 analyzes the images captured by the appropriate ones of the sensor arrays 210. More specifically, the fusion processing circuit 208 analyzes images captured by sensor arrays 210 having fields of view that overlap the field of view of the temporal threat detector 202a-c that sensed the detected threat. For example, the fusion processing circuit 208 may compare two images from the appropriate sensor array 210 that were captured nearest in time to the timestamp parameter assigned to the detected threat.

In comparing these two images, the circuit 208 subtracts the values of pixels in these adjacent images to thereby more precisely identify the location of the threat. The threat manifests itself in this situation as a relatively large difference in the values associated with pixels that sense the threat while the differences between other pixels not sensing the threat will be zero or negligible between the adjacent images, as will be understood by those skilled in the art. This allows for improved clutter rejection by using the detection signals from the temporal threat detectors 202 to instruct the fusion processing circuit 208 to subtract an immediate previous frame from a frame that shows the short-burn threat based upon the determined timestamp.

Once the fusion processing circuit 208 has more precisely identified the location of the threat, this information is applied to a countermeasure controller 212. This information includes the time, location, and type of short-burn threat detected. With this information, the countermeasure controller 212 takes the appropriate countermeasures to protect the military vehicle containing the threat launch detection system 200. For example, such countermeasures may include radio frequency (RF) countermeasures or IR countermeasures such as releasing smoke or ejecting a flare. Note that the information about the type of detected short-burn threat allows the countermeasure controller 212 to take a wider range of countermeasures aimed at thwarting the detected threat. For example, where the detected short-burn threat is an RPG the countermeasure controller 212 may direct fire at the RPG in an attempt to explode the RPG before it impacts the military vehicle. The fusion processing circuit 208 is so named because the circuit combines or "fuses" information regarding short-burn threats sensed by the temporal threat detectors 202a-c with spatial tracking information sensed by the sensor arrays 210 to thereby allow the countermeasure controller 212 to take more sophisticated countermeasures in response to the detected threat.

With the system 200, there are a relatively few temporal threat detectors 202a-c and thus the processing demand on the converter 206 and fusion processing circuit 208 to operate even at 1000 samples per second is relatively low. Moreover, a military vehicle can practically be protected over a full hemisphere with as few as temporal threat detectors 202. In this situation, the sampling data rate that the fusion processing circuit 208 must process is only about 6000 samples per second at 1000 Hz compared to 100,000,000 samples per second for a staring array at one tenth the sampling rate. Note that although each temporal threat detector 202a-c is described as including a single sensor element (not shown), a sensor array could also be used with the pixels being summed together to get a single pixel value corresponding to the detection signal. The use of an array may not be practical in some situations, however, since each pixel would still need to be read from the array. This would adversely increase the processing burden on the circuit 208 and/or cause a reduction in the rate at which data can be read from the array, possibly limiting the practicality of using such a sensor array. Also note that the system 200 need not include the sensor arrays 210. In another embodiment of the system 200, the sensor arrays 210 are omitted and the temporal threat detectors 202 and other components operate only to detect short-burn threats and to take appropriate countermeasures in response to any such detected threats.

Figure 3:
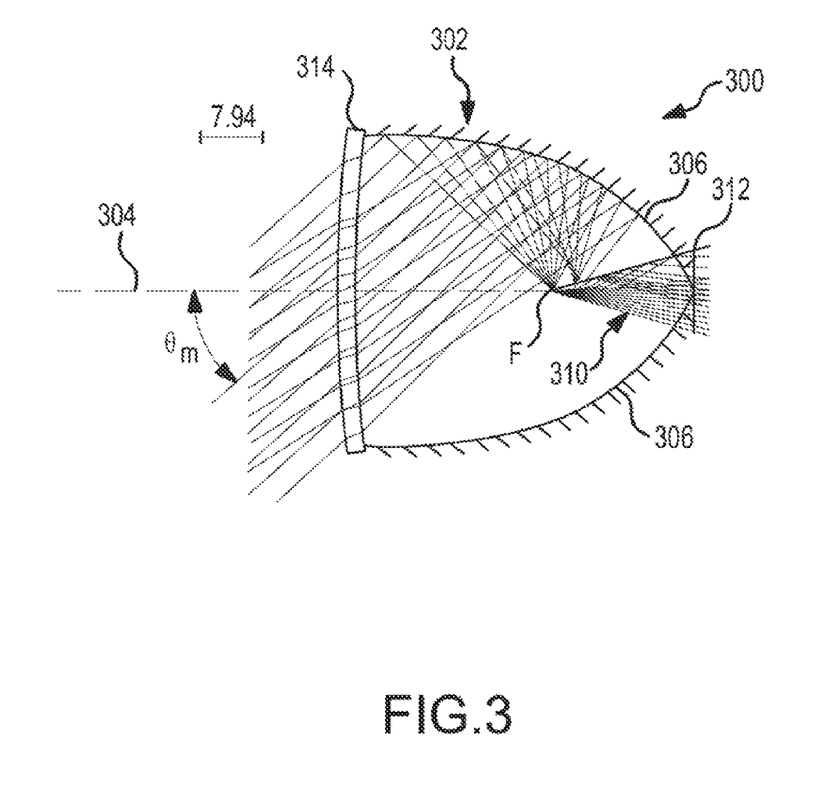
FIG. 3 is a vertical cross-sectional schematic view of a prism-coupled compound parabolic concentrator embodiment of one of the temporal threat detectors of FIG. 2 according to one embodiment of the present invention.

FIG. 3 is a vertical cross-sectional schematic view of a prism-coupled compound parabolic concentrator (PCCP) 300 corresponding to one embodiment of any of the individual temporal threat detectors 202a-c of FIG. 2 according to one embodiment of the present invention. A suitable embodiment of the PCCP 300 is disclosed in "PRISM-COUPLED COMPOUND PARABOLA: A NEW IDEAL AND OPTIMAL SOLAR CONCENTRATOR", L. R. Edmonds, Optics Letters, Vol. 11, No. 8, August 1986, which is incorporated herein by reference.

The PCCP 300 includes a compound parabolic concentrator (CPC) 302 having a focal point F. Ideally, the CPC 302 "collects" all radiation incident upon the CPC within a maximum angle of radiation $\theta_m$ of a normal axis 304. The CPC 302 collects all incident radiation within the maximum angle $\theta_m$ in that all radiation within this angle is reflected off the parabolic surface 306 below the focal point F of the CPC 302. A prism 310 is positioned with its apex at the focal point F of the CPC 302. All radiation incident upon the CPC 302 within the maximum angle $\theta_m$ is thus directed onto the prism 310, which is designed so that all of this radiation incident upon the prism is directed to the base of the prism through total internal reflection. A sensor 312 is attached to the base of the prism 310 to sense the collected radiation. In response to the collected radiation incident upon the sensor 312, the sensor generates a detection signal corresponding to the detection signals previously discussed with reference to the temporal threat detectors 202a-c of FIG. 1. A protective window 314 is mounted to cover an aperture formed at an end of the parabolic surface 306 opposite the end at which the prism 310 is positioned.

The PCCP 300 has a concentration ratio or factor C given by the following equation:

$$C = \frac{n^2}{\sin^2 \theta_m}. \qquad \text{Equation 1}$$

where n is an index of refraction of the prism 310 and $\theta_m$ once again is the maximum angle of radiation collected by the concentrator. The concentration factor C is the ratio of the input aperture of the CPC 302 to the area of the detector 312.

For the midwave infrared spectrum (3-5 microns), the prism 310 is formed from silicon in one embodiment of the PCCP 300. Silicon is utilized due to its high quality, high index of refraction (3.4), and relatively low cost. In this embodiment, the PCCP has a value of C of about 20:1 for a ±45 degrees for the maximum angle of radiation $\theta_m$. In this embodiment, antireflection coatings may be formed on the protective window 314, prism 310, and interface between the prism and sensor 312 mounted at the base of the prism. In another embodiment, the prism 310 is germanium and the PCCP 300 operates in the long wave or thermal infrared band of 7.5 to 12 microns. In a further embodiment, the PCCP 300 operates as an EO band device in which the prism is plastic or high index glass and the sensor 312 is a silicon device. With this embodiment, more PCCPs 300 would be needed for the system 200 (FIG. 2) since reasonable values for the concentration ratio C limits this embodiment of the PCCP to relatively narrow fields of view. For an index of refraction of n=1.8, a field of view of ±43 degrees is possible with a 20:1 concentration ratio C. This embodiment of the PCCP 300 may be particularly useful for enhancing the capability and functionality of existing threat launch detection systems such as UV and IR missile launch detectors.

Figure 4:
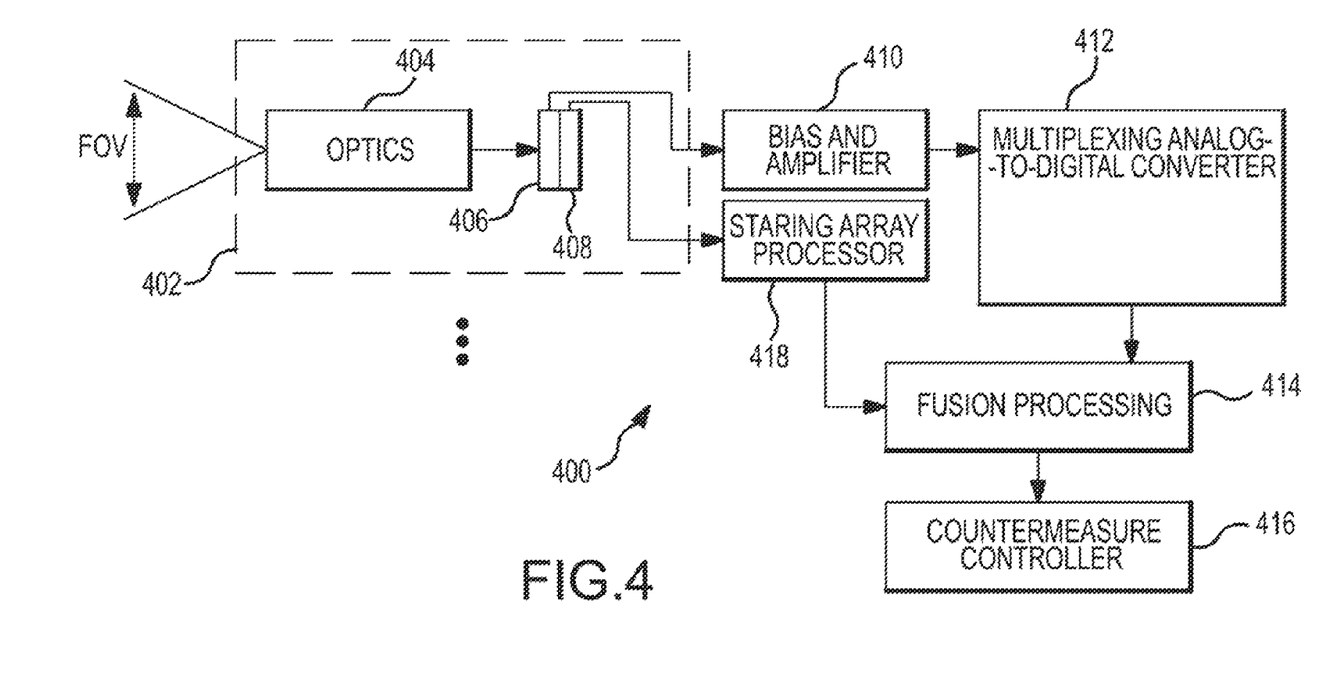
FIG. 4 is a schematic block diagram of a threat launch detection system including a number of threat detectors including optics in combination with a sensor array and a temporal sensor according to another embodiment of the present invention.

FIG. 4 is a schematic block diagram of a threat launch detection system 400 including a number of threat detectors 402, one of which is shown. In this embodiment, each of the threat detectors 402 includes suitable optics 404 for directing incident radiation within a field of view (FOV) onto a single element temporal sensor 406 and onto a sensor array 408. The sensor array 408 is positioned at a focal point of the optics 404. The single element temporal sensor 406 and sensor array 408 may be physically mounted or sandwiched together or simply mounted near one another. The single element temporal sensor 406 operates at a shorter wavelength than the sensor array 408, which allows radiation from the optics 404 at the wavelength of the sensor array to pass through the single element temporal sensor on its way to the sensor array. Note that the single element temporal sensor 406 does not require that the radiation from the optics 404 be focused on this sensor, which allows the optics to be optimized solely for the sensor array 408. This is also the reason the temporal sensor 406 and array 408 need not be mounted any closer together than is appropriate. The threat detector 402 thus combines the single element temporal sensor 406 that develops a detection signal that various over time in response to short-burn threats within the field of view and the sensor array 408 that operates as previously described for such arrays to capture images that allow spatial tracking to identify other types of threats within the field of view.

The detection signal from the temporal sensor 406 is applied to a bias and amplifier circuit 410, which operates in the same way as the bias and amplifier circuits 204 previously described with reference to FIG. 4 to generate a conditioned detection signal. A multiplexing A/D converter 412 receives the conditioned detection signal from each threat detector 402, and this converter operates in combination with a fusion processing circuit 414 and countermeasure controller 416 in the same way as previously described for the corresponding components 206, 208, and 212 of FIG. 2. For the sake of brevity the operation of the components 410-416 will not again be described in detail.

The pixels corresponding to the images captured by the sensor array 408 are supplied to a staring-array processor 418 which processes successive captured images to detect various types of threats, such as launch of guided missile. The staring-array processor 418 supplies information about detected threats to the fusion processing circuit 414, which combines this information with information regarding short-burn threats that the fusion processing circuit generates using the digitized detection signals from the temporal sensor 406 that are supplied to the fusion processing circuit via the A/D converter 412. In response to this processing, the fusion processing circuit 414 provides information to the countermeasure controller 416 that allows the controller to implement appropriate countermeasures based upon the detected threats.

Figure 5:
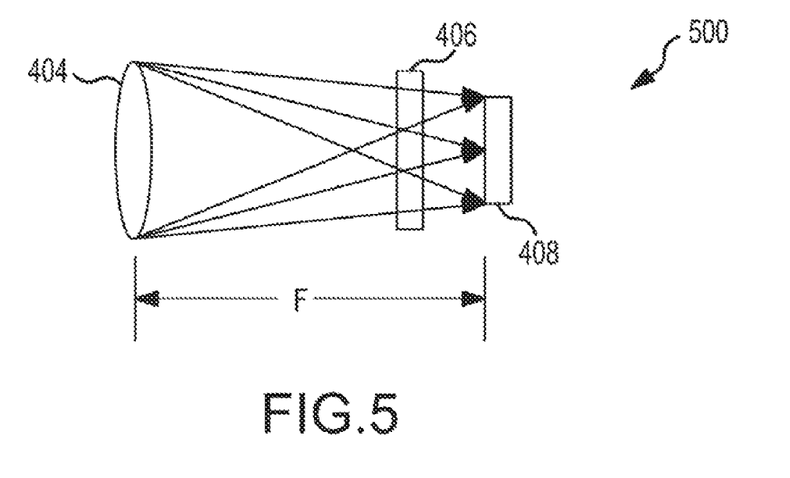
FIG. 5 is a vertical cross sectional schematic diagram showing one embodiment of the threat detector of FIG. 4.

FIG. 5 is a vertical cross sectional schematic diagram showing an embodiment of a threat detector 500 that may be used in place of the threat detector 402 of FIG. 4. The threat detector 500 is another embodiment of threat detector 402 in which the single element temporal sensor 406 is positioned in front of the focal point plane F of the optics 402. The single element temporal sensor 406 need not be positioned in the focal plane F for proper operation since focus is not a concern with this sensor. Thus, the threat detector 500 is similar to the threat detector 402, being different only in the positioning of the sensor 406 in front of the focal plane F whereas the temporal sensor 406 is positioned adjoining the array 408 in the threat detector 402. In another embodiment of the threat detector 402 or 500, the detector includes a beam splitter to separate a temporal channel of incident radiation from a spatial channel of radiation. Such an embodiment is useful when the sensor array 408 is a cryogenic array.

Those skilled in the art will appreciate that the described temporal profiling compliments existing technologies by adding a new observable capability, namely the temporal profiling of high intensity short-burn threats. This provides threat identification and ranging capability to assist conventional sensor arrays in detecting and tracking threats, many of which such arrays could "see" but would not normally detect as a threat. It will also be appreciated that the temporal profiling is very difficult to implement using sensor arrays. Short-burn threats typically last 15 to 100 ms, making them difficult to sample at typical video frame rates inherent with the use of sensor arrays. Moreover, line of sight motion during these events of the order of $1/10$ pixel can corrupt the output of a single pixel in the array. This corruption is due to the signal spot corresponding to the threat falling on a several pixels which share the total signal. Correcting for this requires considerable signal processing particularly in complex bright backgrounds. A single channel covering a wide field of view collects sufficient samples, without sharing, to be able to identify short-burn threats. Combining a temporal channel with an imaging sensor or sensor array solves the tracking and countermeasure effectiveness problems for the tracker while the temporal channel enables the imaging sensor to rapidly type new tracks and identify others with signal to noise levels too low for its stand-alone recognition algorithms.

Embodiments of the present invention allow for system robustness by virtue of two complimentary detection approaches with much less complexity than current and pending multi spectral imaging systems. Embodiments of the present invention also allow for elimination of the adverse tradeoff of frame rate as required for discrimination versus sensitivity as required for many threats. This tradeoff is not significant for some cryogenically cooled sensors, which are more sensitive than threat warning requires at high frame rates. However, some cryogenically cooled devices such as quantum well infrared photodetectors ("QWIPs) are near the limit and would benefit from longer integration time. This new approach enables uncooled devices to take advantage of temporal profiling with frame rates well suited to their optimum performance.

One skilled in the art will also be understood that the embodiments of this invention can also be used to augment artillery fire finder radar by eliminating transmission until incoming fire occurs. The type of fire can be recognized to thereby reduce search volume. Enemy artillery can no longer easily locate the fire finder radar so that its operation is safer.

One skilled in the art will understood that even though various embodiments and advantages of the present invention have been set forth in the foregoing description, the above disclosure is illustrative only, and changes may be made in detail, and yet remain within the broad principles of the invention. It should also be noted that the functions performed by the components 204-212 can be combined to be performed by fewer elements or divided and performed by more elements, with the specific division of functionality depending upon the actual components used in the system 200. Therefore, the present invention is to be limited only by the appended claims.

What is claimed is:

1. A threat launch detection system, comprising:
    at least one temporal threat detector, each temporal threat detector including a single sensing element operable to sense radiation from various types of short-burn threats that occur within a field of view of the temporal threat detector and to generate a detection signal in response to the sensed radiation; and
    a processing circuit coupled to each temporal threat detector and operable to analyze the detection signal from each temporal threat detector as a function of time to detect the occurrence of a short-burn threat within the field of view of any of the temporal threat detectors.

2. The threat launch detection system of claim 1 wherein each temporal threat detector comprises a prism-coupled compound parabolic concentrator.

3. The threat launch detection system of claim 2 wherein the prism-coupled compound parabolic concentrator includes a prism formed from a material selected from the group consisting of silicon, germanium, plastic, and high-index refraction glass.

4. The threat launch detection system of claim 2 wherein the prism-coupled compound parabolic concentrator has a field of view of approximately ninety degrees.

5. The threat launch detection system of claim 1 wherein each temporal threat detector comprises:
    optics operable to receive incident radiation and to focus this radiation in a focal plane;

a single sensor element positioned relative to the optics to receive radiation passing through the optics; and a sensor array positioned in the focal plane to receive focused radiation from the optics.

6. The threat launch detection system of claim 5 wherein the single sensor element is positioned adjoining the sensor array between the sensor array and the optics.

7. The threat launch detection system of claim 5 wherein the single sensor element is positioned between the sensor array and the optics at a distance that is less than a distance of the focal plane from the optics.

8. The threat launch detection system of claim 1 wherein the processing circuit includes a temporal template for each short-burn threat to be detected, and wherein the processing circuit compares each detection signal to each of the temporal templates and determines a short-burn threat exists when the detection signal approximately matches one of the temporal templates.

9. The threat launch detection system of claim 1 further comprising an artillery fire finder radar, wherein the threat launch detection system is operable to eliminate transmission by the fire finder radar until incoming fire is detected.

10. The threat launch detection system of claim 9 wherein the system is further operable to utilize the detected short-burn threat to reduce the search space of the fire finder radar.

11. A threat launch detection system, comprising:
a plurality of temporal threat detectors, each temporal threat detector including a single sensing element operable to sense radiation from various types of short-burn threats that occur within a field of view of the detector and to generate a detection signal in response to the sensed radiation;
a plurality of bias and amplification circuits, each bias and amplification circuit coupled to a corresponding temporal threat detector and operable to bias and amplify the corresponding detection signal to develop a conditioned detection signal;
a multiplexing analog-to-digital converter coupled to each of the bias and amplification circuits to receive the corresponding conditioned detection signal, the converter operable to sequentially digitize each of the conditioned detection signals;
a plurality of sensor arrays, each sensor array operable to capture images of threats within a field of view of the array;
a fusion processing circuit coupled to the multiplexing analog-to-digital converter and the sensor arrays, the fusion processing circuit analyzing the detection signals from each temporal threat detector as a function of time to detect the occurrence of a short-burn threat within a field of view of any of the temporal threat detectors and thereafter operable to process images from one or more of the sensor arrays having fields of view that overlap the field of view of the temporal threat detector that sensed the short-burn threat, the fusion processing circuit processing the images to more precisely identify a location of the detected threat; and
a countermeasure controller coupled to the fusion processing circuit, the controller operable to implement countermeasures in response to the location and type of detected threat.

12. The threat launch detection system of claim 11 wherein the fusion processing circuit is further operable in response to detecting a short-burn threat to assign a timestamp, type indicator, and identifier to the detected threat.

13. The threat launch detection system of claim 12 wherein the fusion processing circuit is operable to process images from one or more of the sensor arrays by comparing two images from the appropriate sensor array that were captured nearest in time to the timestamp parameter assigned to the detected threat.

14. The threat launch detection system of claim 11 wherein each temporal threat detector comprises a prism-coupled compound parabolic concentrator.

15. The threat launch detection system of claim 14 wherein the prism-coupled compound parabolic concentrator includes a prism formed from a material selected from the group consisting of silicon, germanium, plastic, and high-index refraction glass.

16. The threat launch detection system of claim 11, wherein each temporal threat detector comprises:
optics operable to receive incident radiation and to focus this radiation in a focal plane;
a single sensor element positioned relative to the optics to receive radiation passing through the optics;
one of the sensor arrays positioned in the focal plane to receive focused radiation from the optics; and
wherein the fusion processing circuit further includes a staring array processor for processing the images captured from the sensor arrays.

17. The threat launch detection system of claim 16 wherein the single sensor element is positioned either adjoining the sensor array between the sensor array and the optics or between the sensor array and the optics at a distance that is less than a distance of the focal plane from the optics.

18. A method of detecting and indicating detection of short-burn threats, the method comprising:
sensing radiation within a field of view;
generating a single detection signal in response to the sensed radiation;
analyzing the single detection signal as a function of time;
detecting from the analysis whether the single detection signal indicates a short-burn threat has occurred within the field of view;
wherein analyzing the single detection signal as a function of time comprises:
comparing the single detection signal to a plurality of temporal templates, each temporal template being associated with a particular type of short-burn threat;
determining a short-burn threat exists when the single detection signal approximately matches one of the temporal templates; and
generating a signal indicating a short-burn threat exists, the signal including parameters assigned to the short-burn threat to facilitate subsequent identification of a more precise location of the short-burn threat.

19. The method of claim 18 further comprising when it is determined that a short-burn threat exists, activating a fire finder radar system.

20. The method of claim 18 wherein in the associated parameters comprise:
a timestamp indicating when the short-burn threat started;
a type indicator indicating the type of short-burn threat detected; and
an identifier indicating the field of view in which the short-burn threat exists.

21. A method of detecting and identifying the location of short-burn threats, comprising:
sensing radiation within a field of view;
generating a single detection signal in response to the sensed radiation;
analyzing the single detection signal as a function of time;

detecting from the analysis whether the single detection signal indicates a short-burn threat exists within the field of view;

capturing images of the field of view being sensed; and when it is detected that a short-burn threat exists, analyzing the captured images to identify more specifically a location of the short-burn threat.

22. The method of claim 21 further comprising taking countermeasures in response to detecting a short-burn threat.

23. The method of claim 21 wherein the types of short-burn threats include tank shells and rocket-propelled grenades.

24. The method of claim 21 further comprising when it is determined that a short-burn threat exists, activating a fire finder radar system.

25. A method of detecting short-burn threats, comprising:

sensing radiation within a field of view;

generating a single detection signal in response to the sensed radiation;

analyzing the single detection signal as a function of time;

detecting from the analysis whether the single detection signal indicates a short-burn threat has occurred within the field of view;

wherein analyzing the single detection signal as a function of time comprises:

comparing the single detection signal to a plurality of temporal features, with unique combinations of temporal features comprising a temporal template being associated with a particular type of short-burn threat;

determining a short-burn threat exists when the single detection signal approximately matches one of the temporal templates; and generating a signal indicating a short-burn threat exists.

* * * * *